(12) United States Patent
Jackson et al.

(10) Patent No.: US 11,346,680 B2
(45) Date of Patent: May 31, 2022

(54) DRIVER EXPERIENCE-BASED VEHICLE ROUTING AND INSURANCE ADJUSTMENT

(71) Applicant: INTERNATIONAL BUSINESS MACHINES CORPORATION, Armonk, NY (US)

(72) Inventors: Jonathan Jackson, Cedar Grove, NC (US); Darryl Adderly, Cary, NC (US); Eric Libow, Raleigh, NC (US); Ajit Jariwala, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

(21) Appl. No.: 15/975,417

(22) Filed: May 9, 2018

(65) Prior Publication Data
US 2019/0346276 A1    Nov. 14, 2019

(51) Int. Cl.
*G01C 21/34*    (2006.01)
*G06Q 40/08*    (2012.01)

(52) U.S. Cl.
CPC ......... *G01C 21/3484* (2013.01); *G06Q 40/08* (2013.01)

(58) Field of Classification Search
CPC ............................ G01C 21/3484; G06Q 40/08
See application file for complete search history.

(56) References Cited

U.S. PATENT DOCUMENTS

| | | | | |
|---|---|---|---|---|
| 8,538,785 | B2 * | 9/2013 | Coleman ................ | G06Q 40/08 705/4 |
| 8,612,139 | B2 | 12/2013 | Wang et al. | |
| 8,731,736 | B2 * | 5/2014 | Chang ................... | B60W 50/14 340/576 |
| 8,788,299 | B1 | 7/2014 | Medina, III | |
| 9,574,888 | B1 | 2/2017 | Hu et al. | |
| 9,727,920 | B1 * | 8/2017 | Healy .................... | G06Q 40/08 |
| 9,865,019 | B2 | 1/2018 | Bogovich et al. | |
| 10,304,142 | B1 * | 5/2019 | Davis ...................... | H04R 1/403 |
| 10,324,463 | B1 * | 6/2019 | Konrardy ............... | G01S 19/14 |
| 11,055,785 | B1 * | 7/2021 | Lundsgaard ........... | G01C 21/34 |
| 2002/0146667 | A1 * | 10/2002 | Dowdell ................. | G09B 7/02 434/62 |
| 2003/0182165 | A1 * | 9/2003 | Kato .................... | G06Q 10/025 705/4 |
| 2003/0191581 | A1 * | 10/2003 | Ukai ..................... | G07C 5/008 705/4 |
| 2004/0124971 | A1 * | 7/2004 | MacTavish .......... | G07C 5/0816 340/425.5 |

(Continued)

*Primary Examiner* — Jeff A Burke
*Assistant Examiner* — Kyle T Johnson
(74) *Attorney, Agent, or Firm* — Cantor Colburn LLP; Teddi Maranzano (57) ABSTRACT

Providing routing based on driver experience is provided. Aspects include receiving a destination from a user, calculating a plurality of routes from an origin to the destination, and comparing characteristics of each of the plurality of routes with previous driving experience information of the user. Aspects also include calculating an associated risk level for each of the plurality of routes based on the comparison and providing, to the user, a listing of the plurality of routes having the associated risk level indicated. Aspects further include receiving a selected route from the user and providing the selected route and the associated risk level to an insurance provider of the user.

13 Claims, 7 Drawing Sheets

(56) References Cited

U.S. PATENT DOCUMENTS

| | | |
|---|---|---|
| 2007/0282638 A1 | 12/2007 | Surovy |
| 2012/0191343 A1* | 7/2012 | Haleem .............. G01C 21/3461 |
| | | 701/431 |
| 2013/0046559 A1* | 2/2013 | Coleman ................ G06Q 40/08 |
| | | 705/4 |
| 2014/0257869 A1 | 9/2014 | Binion et al. |
| 2015/0262484 A1* | 9/2015 | Victor .................. G09B 19/167 |
| | | 701/1 |
| 2016/0086285 A1* | 3/2016 | Jordan Peters .. G08G 1/096827 |
| | | 705/4 |
| 2016/0171521 A1 | 6/2016 | Ramirf7 et al. |
| 2016/0189303 A1* | 6/2016 | Fuchs .................... G06Q 40/08 |
| | | 705/4 |
| 2016/0189311 A1* | 6/2016 | Erickson ................ G06Q 40/08 |
| | | 705/4 |
| 2016/0195406 A1* | 7/2016 | Miles ................. G06Q 10/0639 |
| | | 701/537 |
| 2016/0196613 A1* | 7/2016 | Miles ................. G01C 21/3697 |
| | | 705/4 |
| 2016/0239925 A1* | 8/2016 | Biemer .................. G06Q 40/08 |
| 2017/0221149 A1 | 8/2017 | Hsu-Hoffman et al. |
| 2018/0106633 A1* | 4/2018 | Chintakindi ........ G01C 21/3691 |
| 2018/0174484 A1* | 6/2018 | Bradley ................ G08G 1/0129 |
| 2019/0295178 A1* | 9/2019 | Komizo ................ G06Q 40/08 |
| 2019/0346276 A1* | 11/2019 | Jackson ................ G06Q 40/08 |

\* cited by examiner

DRIVER EXPERIENCE-BASED VEHICLE ROUTING AND INSURANCE ADJUSTMENT

BACKGROUND

The invention relates generally to navigation and, more specifically, to a vehicle routing system that based on the experience of a driver and to adjusting the insurance rates of the driver based on their route selection.

Increasingly, global positioning systems (GPSs), hand-held devices, and online map routing services provide mechanisms to navigate from one point to another by calculating paths based on information derived from roadway maps. These routing services typically have added features to automatically calculate the type of directions desired. For example, added features may allow an operator to specify routing objectives such as: shortest distance (using an algorithm to determine the shortest distance from one point to the next); least amount of travel time (using an algorithm to determine the shortest distance based on the roads speed limit and distance, and calculating the resulting driving time); least use of freeways; least use of energy (gasoline and/or electricity); and least use of toll roads.

Routing systems typically include cartographic maps and map databases to determine an appropriate driving route. The map databases represent a network of roads and often include information about toll roads, speed limits, highway exit points, and points of interest (POIs). The map databases also include points on a map represented in the form of latitudes and longitudes, universal transverse Mercator (UTM) coordinates, and/or geospatial coordinates. Some examples of final destinations and/or waypoints include POIs (e.g., museums, restaurants, railways, exit points, etc.), user-entered destinations, and fixed reference points along a route. A typical routing system resolves the starting point and the destination point and/or waypoints on the network and then uses an algorithm to determine a route between two points. Typical route calculations are based on finding shortest or cheapest route between two points.

SUMMARY

According to an embodiment, a navigation system is provided. The system includes a memory having computer readable computer instructions, and a processor for executing the computer readable instructions. The computer readable instructions include receiving a destination from a user, calculating a plurality of routes from an origin to the destination, and comparing characteristics of each of the plurality of routes with previous driving experience information of the user. The computer readable instructions also include calculating an associated risk level for each of the plurality of routes based on the comparison and providing, to the user, a listing of the plurality of routes having the associated risk level indicated. The computer readable instructions further include receiving a selected route from the user and providing the selected route and the associated risk level to an insurance provider of the user.

According to another embodiment, a method for providing routing based on driver experience is provided. The method includes receiving a destination from a user, calculating a plurality of routes from an origin to the destination, and comparing characteristics of each of the plurality of routes with previous driving experience information of the user. The method also includes calculating an associated risk level for each of the plurality of routes based on the comparison and providing, to the user, a listing of the plurality of routes having the associated risk level indicated. The method further includes receiving a selected route from the user and providing the selected route and the associated risk level to an insurance provider of the user.

According to a further embodiment, a computer program product is provided. The computer program product includes a computer readable storage medium having program instructions embodied therewith. The program instructions are executable by a computer processor to cause the computer processor to perform a method. The method includes receiving a destination from a user, calculating a plurality of routes from an origin to the destination, and comparing characteristics of each of the plurality of routes with previous driving experience information of the user. The method also includes calculating an associated risk level for each of the plurality of routes based on the comparison and providing, to the user, a listing of the plurality of routes having the associated risk level indicated. The method further includes receiving a selected route from the user and providing the selected route and the associated risk level to an insurance provider of the user.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
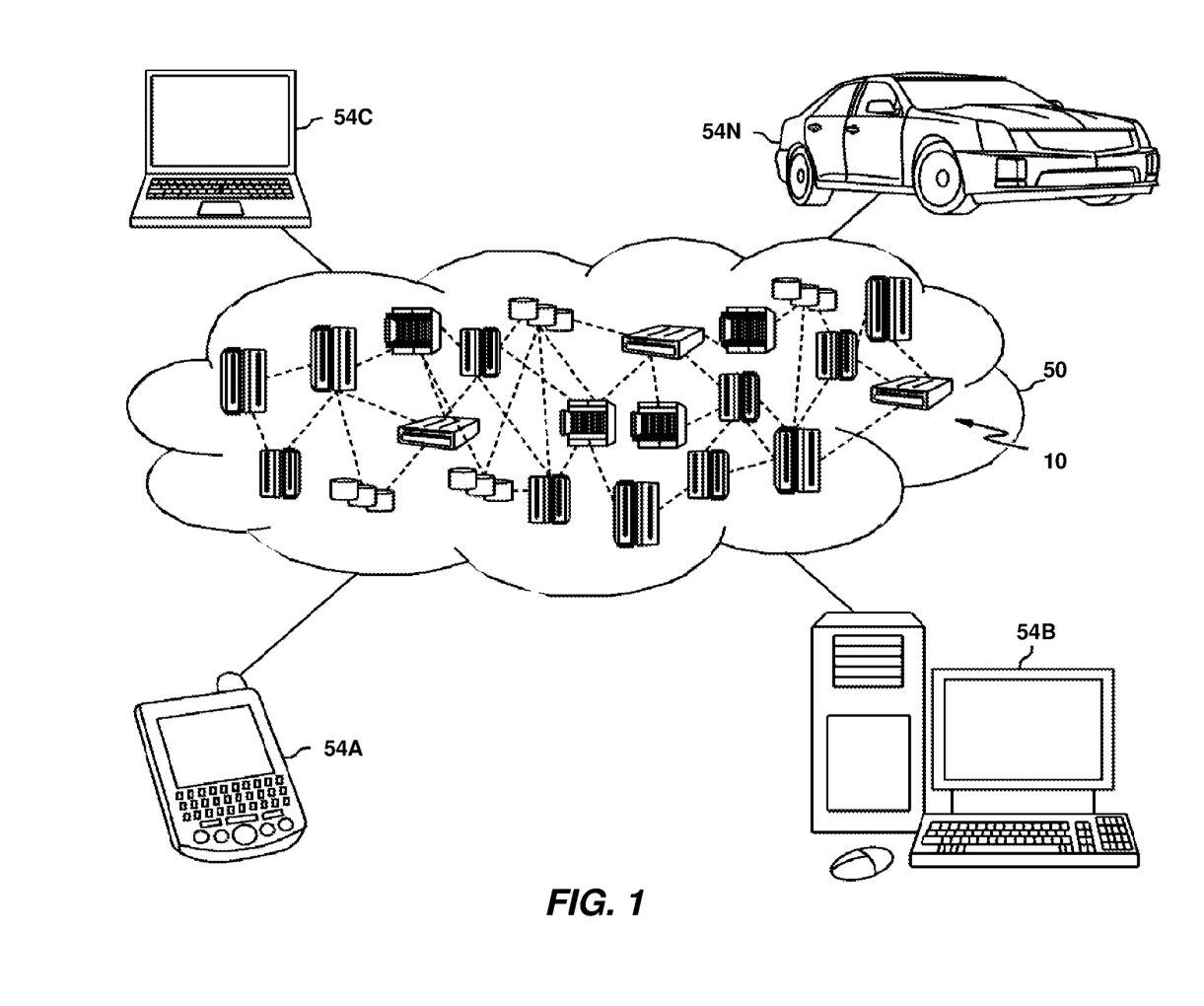
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
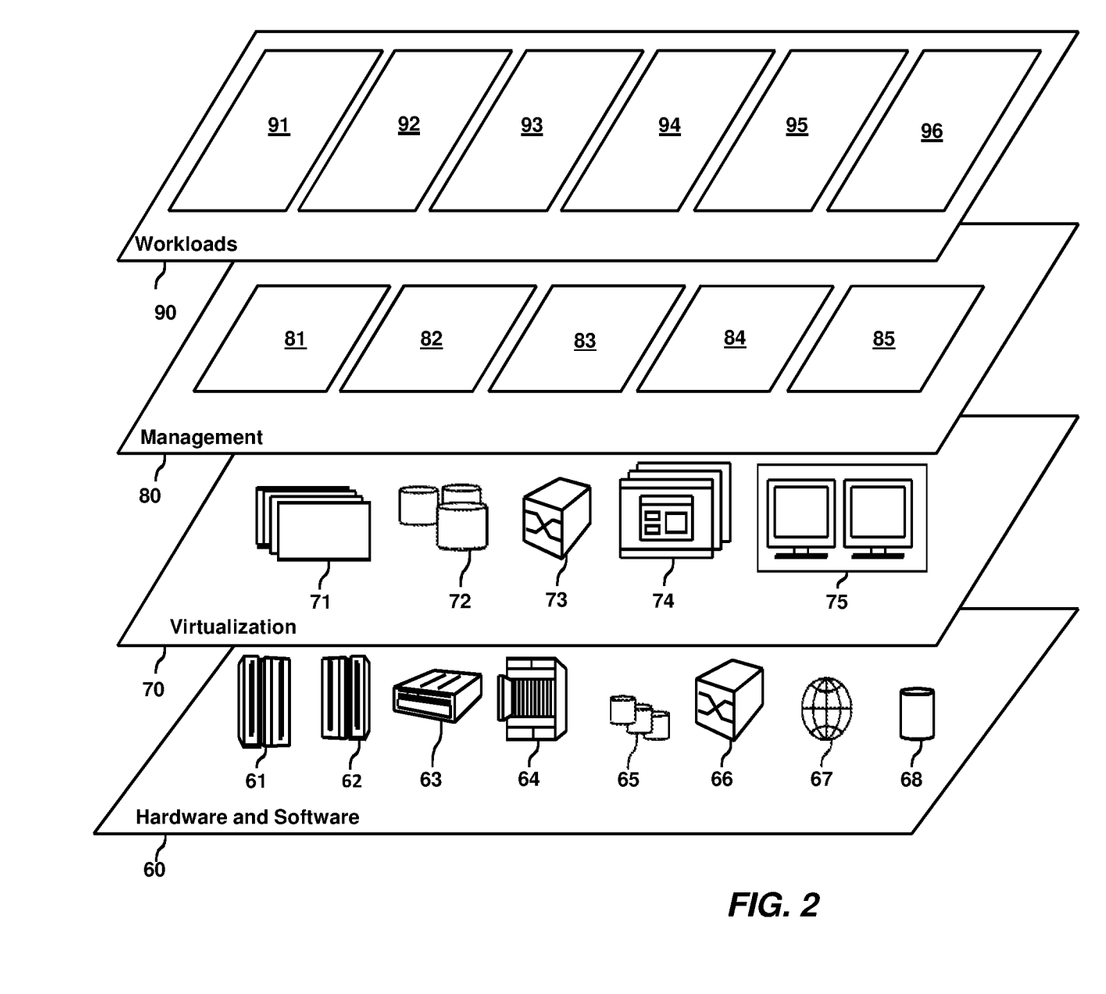
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle routing 96.

Figure 3:
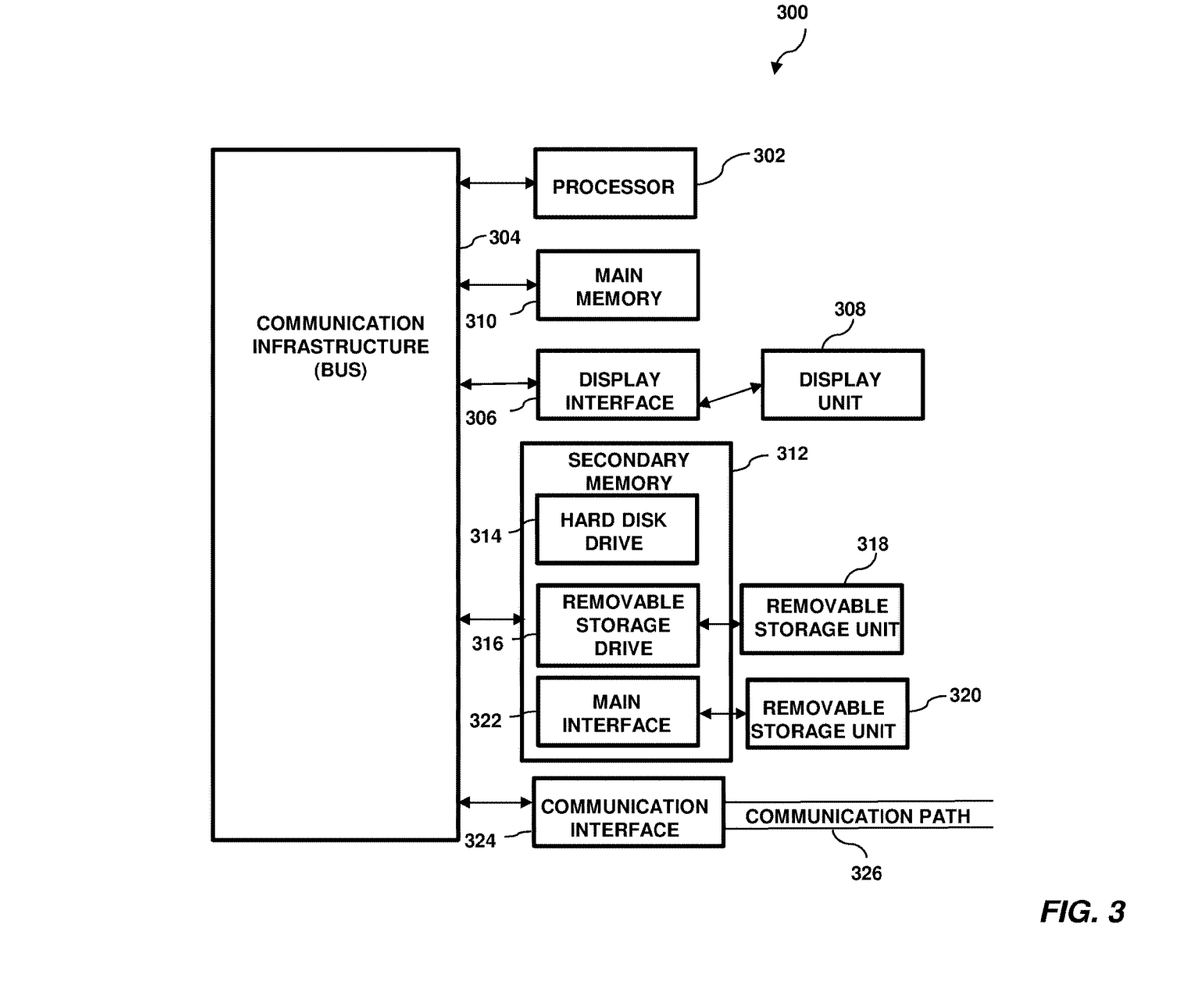
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Navigation systems offer useful directions to drivers who require assistance in locating a desired destination address in an area that is unfamiliar to them or for helping a user in selecting an optimal route to the desired destination address. As discussed above, vehicle routing systems typically allow a user to select a routing objective such as shortest distance; least amount of travel time; least use of freeways; and least use of toll roads.

In exemplary embodiments, a routing system is provided that considers a driver's experience level when evaluating routes for the driver. The routing system is configured to rank the routes based on the personalized risks level for the driver and to report the routes selected by the driver to the insurance company of the driver. In exemplary embodiments, the insurance company can use this information to set or adjust the premium charged to the driver. For example, if a driver chooses lower risk routes, their rate would be lower than someone who chooses higher risk (but potentially faster) routes. In some embodiments, insurance companies may present drivers with an instantaneous increase in premium when the user chooses a riskier route. For example, a user may receive a pop up in a routing application that the selection of this route will increase their premium by a set amount.

In exemplary embodiments, the routing system is also configured to consider an experience level of a driving coach in the vehicle with a driver when evaluating routes for the driver. The routing system is configured to rank the routes based on a learning level for the driver based on the route, the driver's experience level and the driving coach's experience level. The selected routes and the presence of the coach can be to the insurance company of the driver. In exemplary embodiments, the insurance company can use this information to set or adjust the premium charged to the driver. In addition, the experience level of the driver is updated upon the driver completing the selected route.

Figure 4:
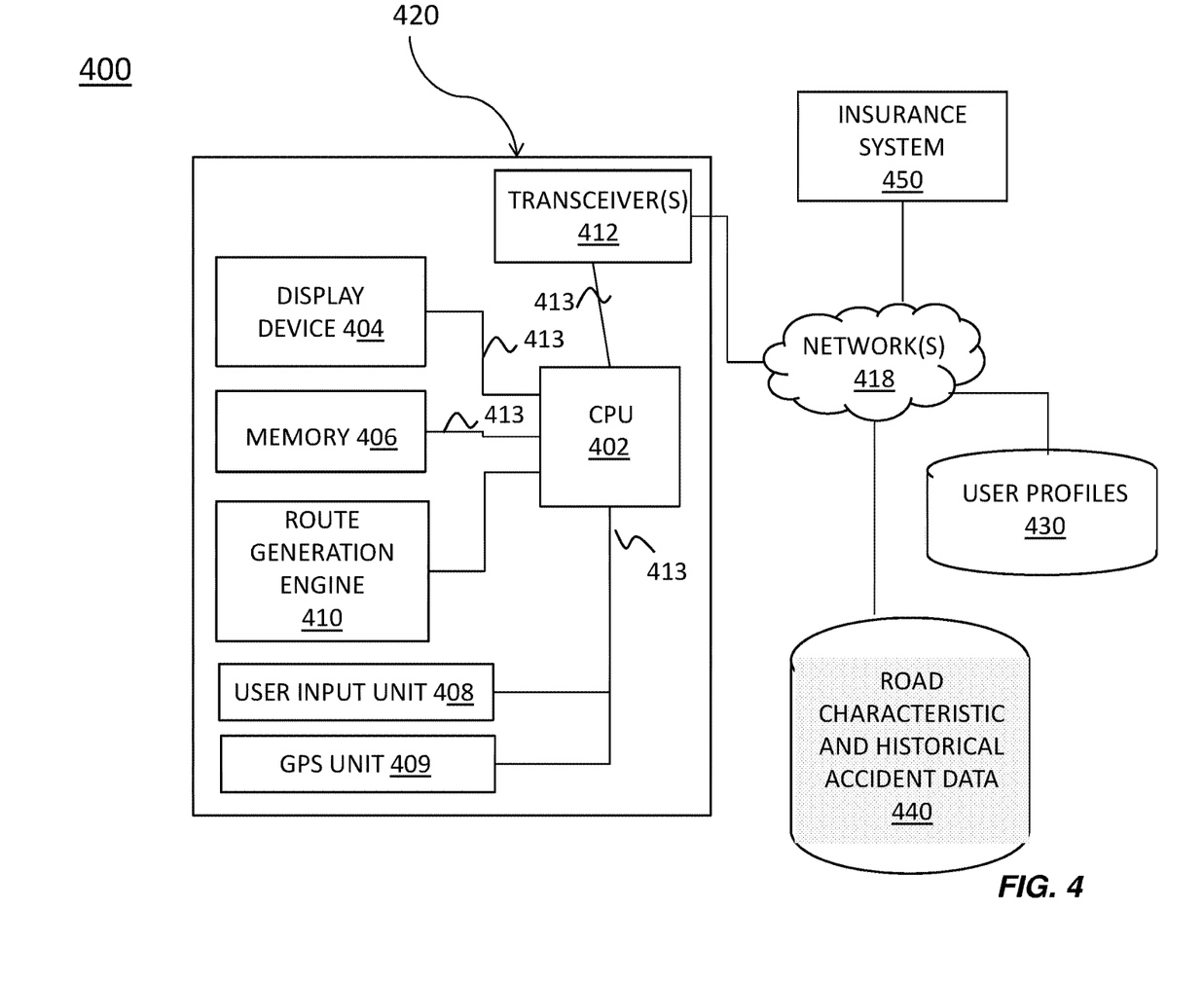
FIG. 4 depicts a system upon which vehicle routing and navigation processes may be implemented according to an embodiment of the invention.

Turning now to FIG. 4, a system 400 upon which the vehicle routing and navigation processes may be implemented will now be described in an embodiment. The system 400 shown in FIG. 4 includes components of a navigation system 420, which in turn includes a processor 402, a display device 404, a memory 406, a user input unit 408, a GPS unit 409, a route generation engine 410, and a transceiver 412. These components may be communicatively coupled via one or more communication buses 413, e.g., a data bus.

The navigation system 420 may be communicatively coupled to one or more communication networks 418 via, e.g., a wireless network interface. In an embodiment, the transceiver 412 is configured to receive signals from a global positioning system (GPS) unit 409 and to communicate with various other systems via the networks 418. The various other systems can include, but are not limited to, a user profile database 430, a road characteristic and historical accident database system 440 and an insurance system 450.

The processor 402 is configured to receive inputs (e.g., the desired destination location) from a user via the user input unit 408 and execute the route generation engine 410 as described herein. In an embodiment, the processor 402 may be integrated into a vehicle control module such as, for example, an infotainment control module or a navigation control module.

The user input unit 408 may be implemented as a keypad or a keyboard for allowing a user to input information, such as a destination address. In an embodiment, the display device 404 may be a liquid crystal display (LCD) screen that is used to display graphics and text. The display screen 404 displays routes generated by the route generation engine 410. Although FIG. 4 illustrates the user input unit 408 and the display device 404 as separate components, it is understood that the user input unit 408 and the display device 404 may be a combined unit. For example, in an embodiment the display device 404 is a touchscreen that detects the presence and location of a user's touch.

In an embodiment, the memory 406 stores a database of maps for generating routes. The memory 406 also stores previously generated routes that have been driven by a user of the vehicle as well as previous locations that the user has visited that are recognized by overlaying GPS data onto a map when the user did not use a generated route by the navigation system to reach said locations. In a further embodiment, the memory 406 may store a profile of a user that includes an experience level that the user has in driving. The experience level can include experience in navigating roads and intersections having certain characteristics, such as a limited access highway, a roundabout intersection, a reversible lane road, a diverging diamond interchange, and the like. In addition, the experience level can include experience driving in various road conditions, such as snow, ice, high wind, fog, or the like.

The route generation engine 410 includes a mapping tool that takes as input a starting location (e.g., address) and a destination location and returns, as output, one or more routes to follow to get from the starting location to the destination location subject to routing objectives. The route generation engine 410 accesses a database of maps (e.g., stored in the memory 406 for generating the routes). The route generation engine 410 receives characteristics about the roads and intersections along the route as well as the driver's experience level and uses this information to calculate a risk level associated with each route to be provided to the user. These features are described further herein.

The transceiver 412 may be in communication with a satellite (not shown) for providing information regarding a current (or starting) location of the vehicle. Alternatively, the current (or starting) location of the vehicle is determined by obtaining user input. Specifically, the user may input current location information into a keypad, keyboard, or touch screen of the user input unit 408. The networks 418 may be any type of known networks in the art. For example, the networks 418 may be a combination of public (e.g., Internet), private (e.g., local area network, wide area network, virtual private network), and may include wireless and wireline transmission systems (e.g., satellite, cellular network, terrestrial networks, etc.).

The user profile database 430 stores a profile for each driver and driving coach that include an experience level that the driver and driving coach has in driving. The experience level can include experience in navigating roads and intersections having certain characteristics, such as a limited access highway, a roundabout intersection, a reversible lane road, a diverging diamond interchange, and the like. In addition, the experience level can include experience driving in various road conditions, such as snow, ice, high wind, fog, or the like. Furthermore, the experience level can include experience driving at various times of the day.

The road characteristic and historical road condition database 440 is configured to store data that relates to the characteristics of roadways and intersections, such as a limited access highway, a roundabout intersection, a reversible lane road, a diverging diamond interchange, and the like. In addition, the road characteristic and historical road condition database 440 is configured to store accident data for the roads and intersections. The accident data can be accumulated from insurance companies, police reports, or the like. In exemplary embodiments, the insurance system 450 is a computing system used by an insurance provide to determine an insurance premium that will be charged to a driver based on the risk associated with the routes that the user drives.

While the navigation system 420 is described as being integrated with a vehicle, e.g., in a vehicle control module such as, for example, an infotainment control module or a navigation control module, it will be understood that the navigation system 420 may be implemented by alternative means. For example, aspects of the navigation system 420 may be implemented on a personal digital device such as, but not limited to, a smart phone or tablet computer.

Figure 5:
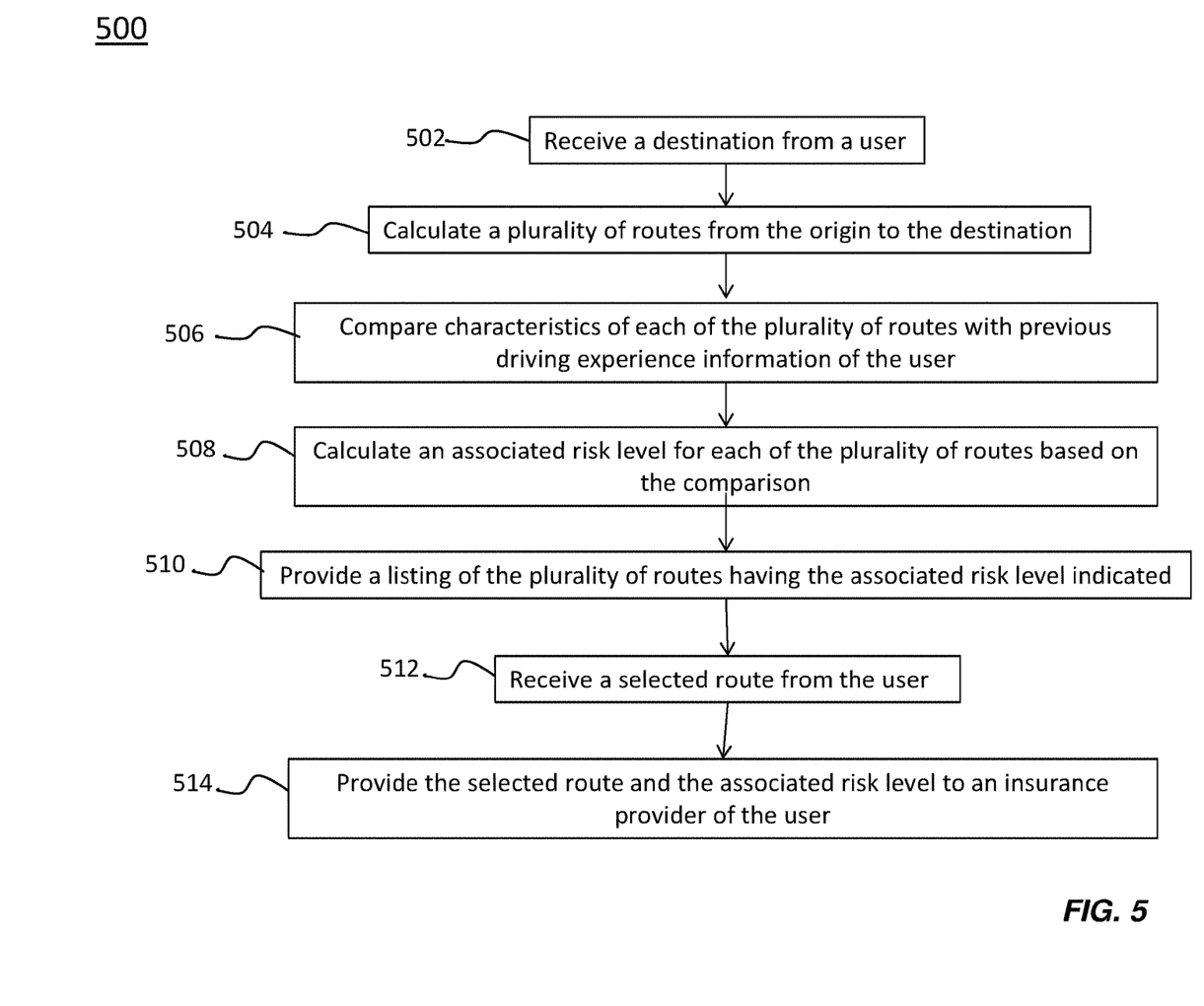
FIG. 5 depicts a flow diagram of a method for providing routing based on driver experience according to an embodiment of the invention.

Turning now to FIG. 5, a flow diagram of a method 500 for providing routing based on driver experience in accordance with an embodiment is shown. The method 500 begins at block 502 where a destination is received from a user. Next, as shown at block 504, the method 500 includes calculating a plurality of routes from an origin to the destination. The method 500 also includes comparing characteristics of each of the plurality of routes with previous driving experience information of the user, as shown at block 506. In exemplary embodiments, the characteristics of each of the plurality of routes include a listing of road types, intersection types, and maneuvers required along each route. In exemplary embodiments, comparing characteristics of each of the plurality of routes with previous driving experience information of the user includes identifying routes that do not include characteristics for which the user does not have experience navigating. Next, as shown at block 508, the method 500 includes calculating an associated risk level for each of the plurality of routes based on the comparison. In exemplary embodiments, the risk level of a route is positively correlated with a number of characteristics for which the user does not have experience navigating. For example, if a user has never, or less than a threshold number of times, navigated through a roundabout intersection, routes with roundabouts will have a higher risk level.

Continuing with reference to FIG. 5, as shown at block 510, the method 500 includes providing, to the user, a listing of the plurality of routes having the associated risk level indicated. In one embodiment, the routes can be provided with a rating that ranges from 1-10 where 1 indicates lowest risk and 10 indicates highest risk. In another embodiment, the routes can be displayed along with an expected impact on a user's insurance rate for driving an indicated route (i.e., save 25 cents, costs an extra dollar). Next, as shown at block 512, the method 500 includes receiving a selected route from the user. The method 500 also includes providing the selected route and the associated risk level to an insurance provider of the user, as shown at block 514. In exemplary embodiments, once a driver completes the selected route this information could be stored locally on a device and/or transmitted in real time to the insurance company.

Figure 6:
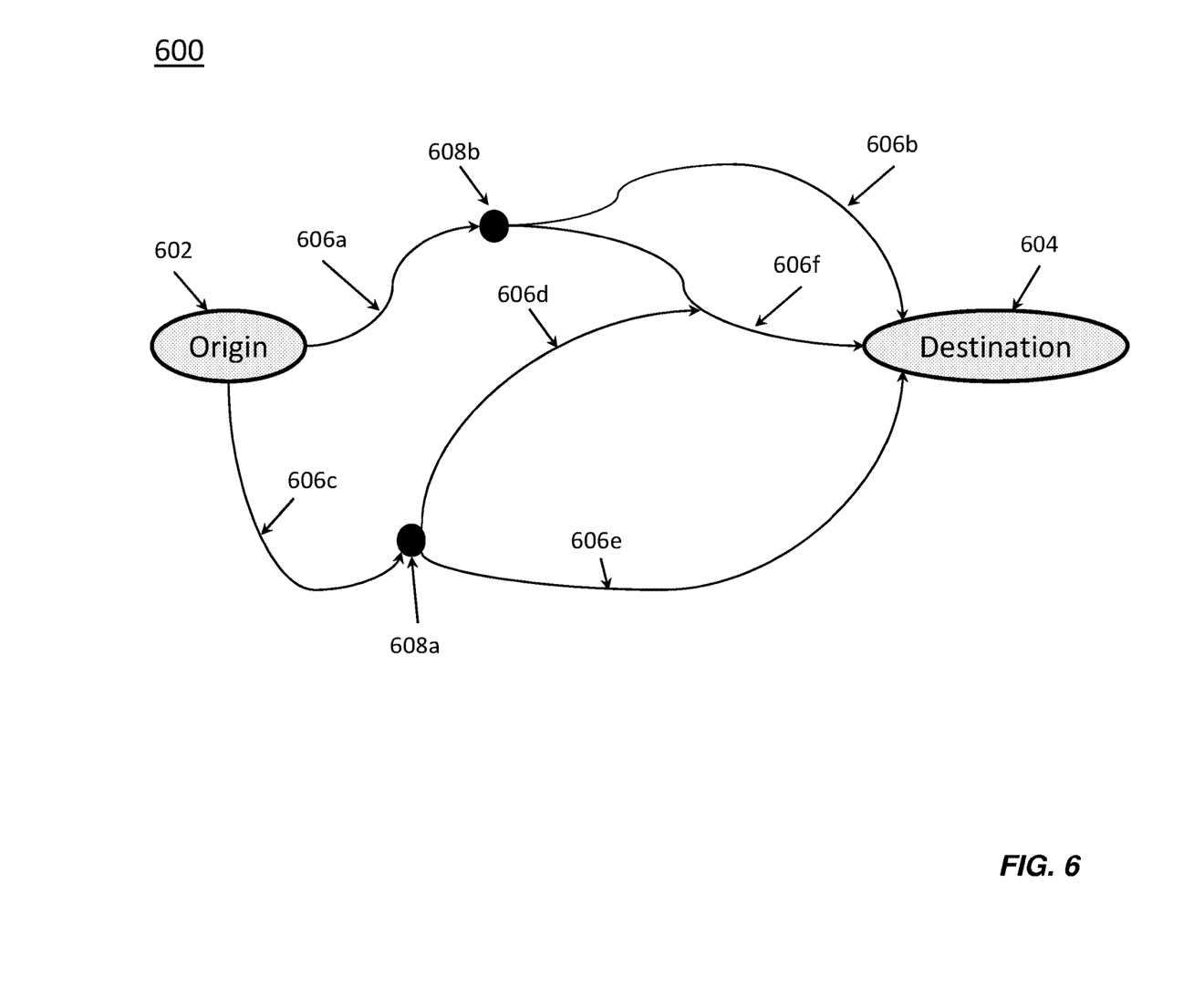
FIG. 6 depicts a map of routes generated by a routing system based on driver experience according to an embodiment of the invention.

Turning now to FIG. 6, a map 600 of routes generated by a routing system based on driver experience is illustrated and will now be described. In the map 600, an origin 602 and a destination 608 are shown. As illustrated, multiple routes exist between the origin 602 and the destination 608. Each route includes multiple path segments 606. As illustrated, there are a variety of potential routes that a user may take to travel between the origin 602 and the destination 608. In exemplary embodiments, the routing system obtains driver experience data and characteristic data about each path segment 606a, 606b, 606c, 606d, 606e, and 606f and about intersection 608a and 608b. The characteristic data about each path segment 606 indicates the type of road, limited access highway, one-way street, reversible lane street, the speed limit of the road, etc. Likewise, the characteristic data about each intersection 608 includes the type of the intersection, such as a roundabout interchange, a turn across multiple lanes of traffic, a diverging diamond intersection, and the like. In one embodiment, the shortest route from the origin 602 to the destination 604 is across segment 606a, through intersection 608b, and across segment 606f. Assume that route segment 606f includes a reversible lane system and the intersection 606b is a roundabout intersection. Accordingly, drivers that do not have experience with either roundabouts or reversible lane system may be routed across segment 606c, through intersection 608a, and across segment 606e. Likewise, drivers that do not have experience with reversible lane systems but that do have experience with roundabouts may be routed across segment 606a, through intersection 608b, and across segment 606b.

Figure 7:
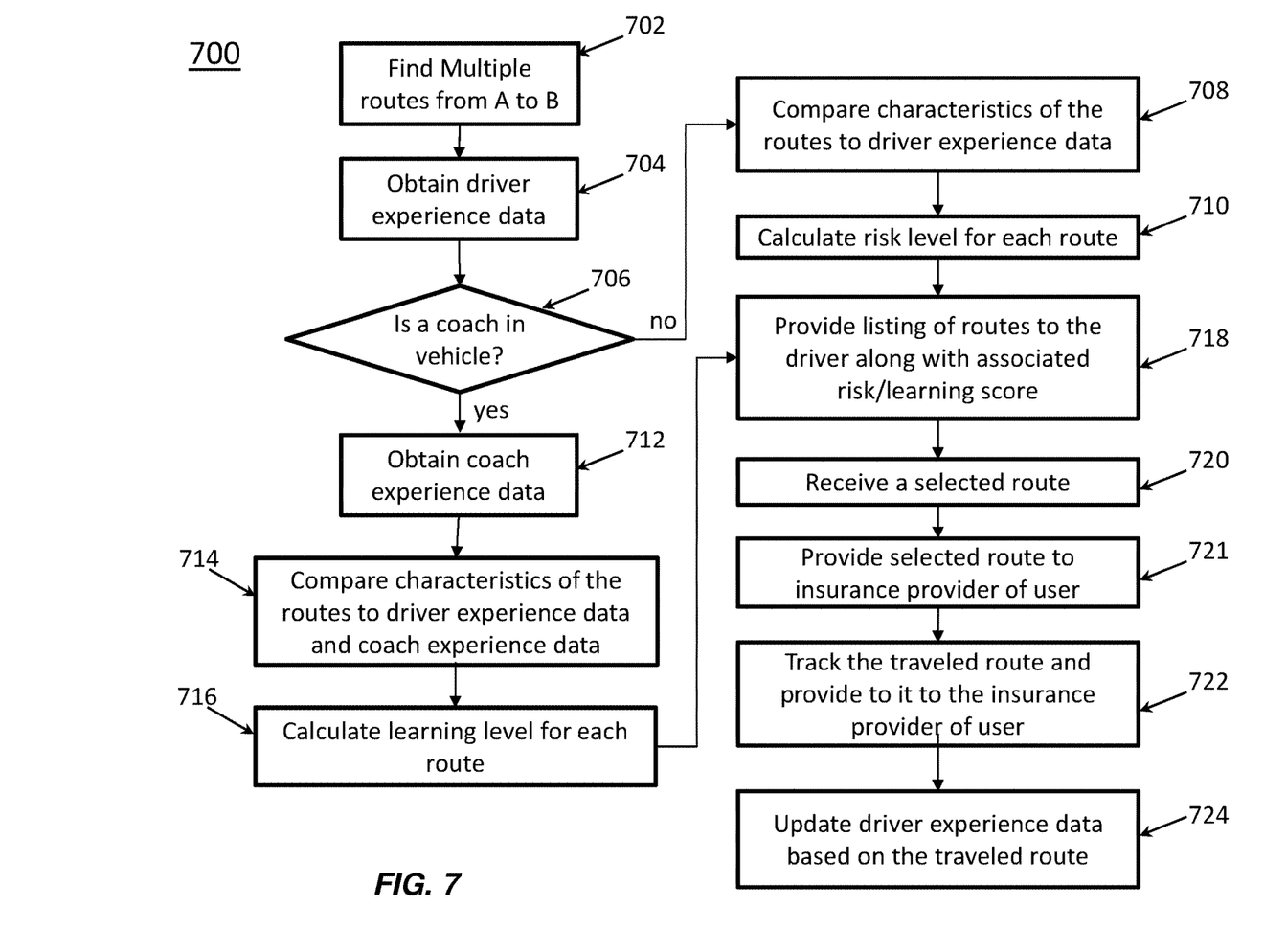
FIG. 7 depicts a flow diagram of a method for providing routing based the experience of a driver and a driving coach according to an embodiment of the invention.

Turning now to FIG. 7, a flow diagram of a method 700 for providing routing based on driver experience will now be described in an embodiment. As shown at block 702, the method 700 includes finding multiple routes from an origin (A) to a destination (B). Next, as shown at block 704, the method 700 also includes obtaining driver experience data. The method 700 also includes determining if a driving coach is in the vehicle with the driver, as shown at decision block 706. If there is a driving coach in the vehicle with the driver, the method proceeds to block 712 and obtains the experience data of the driving coach. Next, as shown at block 714, the method 700 includes comparing characteristics of the routes to both the driver experience data and the driving coach experience data. In exemplary embodiments, comparing characteristics of each of the plurality of routes with previous driving experience information of the driving coach and of the user includes identifying routes that include characteristics for which the driving coach has experience navigating and that the user does not have experience navigating. Next, as shown at block 716, the method 700 includes calculating a learning level for each route based on the comparison. In exemplary embodiments, the learning level of a route is positively correlated with a number of characteristics for which the driving coach has experience navigating and that the user does not have experience navigating.

For example, a route that includes an intersection type that the driver has little or no experience navigating and which the driving coach has experience navigating will have a high learning score.

Continuing with reference to FIG. 7, if there is not a driving coach in the vehicle with the driver, the method 700 proceeds to block 708 and compares the characteristics of each of the plurality of routes with previous driving experience information of the driver. In exemplary embodiments, the characteristics of each of the plurality of routes include a listing of road types, intersection types, and maneuvers required along each route. In exemplary embodiments, comparing characteristics of each of the plurality of routes with previous driving experience information of the user includes identifying routes that do not include characteristics for which the user does not have experience navigating. Next, as shown at block 710, the method 700 includes calculating a risk level for each of the plurality of routes based on the comparison. In exemplary embodiments, the risk level of a route is negatively correlated with a number of characteristics for which the user does not have experience navigating. For example, if a user has never, or less than a threshold number of times, navigated through a roundabout intersection, routes with roundabouts will have a higher risk level.

The method 700 also includes providing a listing of routes to the driver along with associated risk/learning score(s), as shown at block 718. In addition, the listing can include an estimation of the effect that selection of that route will have on the insurance premium of the driver. For example, selection of a low risk route may decrease their next premium by fifty cents and selection of a high risk route may increase their premium by a dollar. Next, as shown at block 720, the method 700 includes receiving a selected route from the user. The method 700 also includes providing the selected route to an insurance provider of the user, as shown at block 721. Next, as shown at block 722, upon completion of the trip, the actual route is recorded and a final score is generated based on the actual route driven before sharing with the insurance company and updating the driver experience. The method 700 concludes at block 724 by updating the experience data of the driver based on driver completing the route traveled.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle having a user experience-based navigation system, the vehicle comprising:
    a display device;
    a memory having computer readable instructions; and
    a vehicle control module for executing the computer readable instructions, the computer readable instructions including instructions for:
    receiving a destination from a user, wherein the origin is a current location of the vehicle;
    calculating a plurality of routes from an origin to the destination;
    identifying a driving coach in a vehicle with the user;
    comparing characteristics of each of the plurality of routes with previous driving experience information of the driving coach and of the user;
    calculating an associated learning level and an associated risk level for each of the plurality of routes based on the comparison, wherein the learning level for each of the plurality of routes is positively correlated with a number of characteristics for which the driving coach has experience navigating and that the user does not have experience navigating and wherein the associated risk level is positively correlated with a number of characteristics for which the user does not have experience navigating; and
    providing, to the user via the display device, a ranked list of the plurality of routes having the associated learning level and associated risk level indicated, wherein the ranked list also includes a change in an insurance premium associated with selection of each of the plurality of routes, wherein the insurance premium changes include one of an increase and a decrease of the insurance premium that is determined based on the associated risk level for each of the plurality of routes;
    receiving a selected route from the user and responsively providing directions for the selected route to the user via the display device;
    providing the selected route, the associated risk level, and an indication of a presence of the driving coach to an insurance provider of the user; and
    updating the previous driving experience information of the user based on the user completing the selected route,
    wherein the ranked list of the plurality of routes is ordered based on the learning level.

2. The vehicle of claim 1, wherein the characteristics of each of the plurality of routes include road types, intersection types, and maneuvers required along each route.

3. The vehicle of claim 1, wherein comparing characteristics of each of the plurality of routes with previous driving experience information of the user includes identifying routes that do not include characteristics for which the user does not have experience navigating.

4. The vehicle of claim 1, wherein comparing characteristics of each of the plurality of routes with previous driving experience information of the driving coach and of the user includes identifying routes that include characteristics for which the driving coach has experience navigating and that the user does not have experience navigating.

5. A method for routing a vehicle based on driver experience, comprising:
    receiving, by a vehicle control module via a user input unit, a destination from a user;
    calculating, by the vehicle control module, a plurality of routes from an origin to the destination, wherein the origin is a current location of the vehicle;
    identifying a driving coach in a vehicle with the user;
    comparing characteristics of each of the plurality of routes with previous driving experience information of the driving coach and of the user;
    calculating, by the vehicle control module, an associated learning level and an associated risk level for each of the plurality of routes based on the comparison, wherein the learning level for each of the plurality of routes is positively correlated with a number of characteristics for which the driving coach has experience navigating and that the user does not have experience navigating; and
    providing, to the user, a ranked list of the plurality of routes having the associated learning level and associated risk level indicated, wherein the ranked list also includes a change in an insurance premium associated with selection of each of the plurality of routes, wherein the insurance premium changes include one of an increase and a decrease of the insurance premium that is determined based on the associated risk level for each of the plurality of routes;

receiving a selected route from the user and responsively providing directions for the selected route to the user via the display device; and providing the selected route, the associated risk level, and an indication of a presence of the driving coach to an insurance provider of the user, wherein the ranked list of the plurality of routes is ordered based on the learning level.

6. The method of claim 5, wherein the characteristics of each of the plurality of routes include road types, intersection types, and maneuvers required along each route.

7. The method of claim 5, wherein comparing characteristics of each of the plurality of routes with previous driving experience information of the user includes identifying routes that do not include characteristics for which the user does not have experience navigating.

8. The method of claim 7, wherein the risk level is positively correlated with a number of characteristics for which the user does not have experience navigating.

9. The method of claim 5, wherein comparing characteristics of each of the plurality of routes with previous driving experience information of the driving coach and of the user includes identifying routes that include characteristics for which the driving coach has experience navigating and that the user does not have experience navigating.

10. The method of claim 5, the method further comprises updating the previous driving experience information of the user based on the user completing the selected route.

11. A computer program product comprising a computer readable storage medium having program instructions embodied therewith the program instructions executable by a computer processor to cause the computer processor to perform a method, comprising:

receiving, by a vehicle control module via a user input unit, a destination from a user;

calculating, by the vehicle control module, a plurality of routes from an origin to the destination, wherein the origin is a current location of the vehicle;

identifying a driving coach in a vehicle with the user;

comparing characteristics of each of the plurality of routes with previous driving experience information of the driving coach and of the user;

calculating, by the vehicle control module, an associated learning level and an associated risk level for each of the plurality of routes based on the comparison, wherein the learning level for each of the plurality of routes is positively correlated with a number of characteristics for which the driving coach has experience navigating and that the user does not have experience navigating; and providing, to the user, a ranked list of the plurality of routes having the associated learning level and associated risk level indicated, wherein the ranked list also includes a change in an insurance premium associated with selection of each of the plurality of routes, wherein the insurance premium changes include one of an increase and a decrease of the insurance premium that is determined based on the associated risk level for each of the plurality of routes;

receiving a selected route from the user and responsively providing directions for the selected route to the user via the display device; and providing the selected route, the associated risk level, and an indication of a presence of the driving coach to an insurance provider of the user, wherein the ranked list of the plurality of routes is ordered based on the learning level.

12. The computer program product of claim 11, wherein comparing characteristics of each of the plurality of routes with previous driving experience information of the driving coach and of the user includes identifying routes that include characteristics for which the driving coach has experience navigating and that the user does not have experience navigating.

13. The computer program product of claim 12, wherein the learning level is positively correlated with a number of characteristics for which the driving coach has experience navigating and that the user does not have experience navigating.

* * * * *